US011688037B2

(12) United States Patent
Calhoun et al.

(10) Patent No.: US 11,688,037 B2
(45) **Date of Patent: *Jun. 27, 2023**

(54) SYSTEMS AND METHODS INVOLVING CREATION AND/OR UTILIZATION OF IMAGE MOSAICS IN CLASSIFICATION OF ACOUSTIC EVENTS

(71) Applicant: ShotSpotter, Inc., Newark, CA (US)

(72) Inventors: Robert B. Calhoun, Newark, CA (US); Scott Lamkin, Newark, CA (US); David Rodgers, Newark, CA (US)

(73) Assignee: ShotSpotter, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,846

(22) Filed: Oct. 12, 2021

(65) Prior Publication Data

US 2022/0180474 A1 Jun. 9, 2022

Related U.S. Application Data

(63) Continuation of application No. 17/381,084, filed on Jul. 20, 2021, now abandoned, which is a (Continued)

(51) Int. Cl.

*G06T 3/40* (2006.01)
*G06T 5/00* (2006.01)

(Continued)

(52) U.S. Cl.

CPC ............ *G06T 3/4038* (2013.01); *G06F 17/15* (2013.01); *G06F 18/24* (2023.01); *G06N 3/04* (2013.01);

(Continued)

(58) Field of Classification Search

None

See application file for complete search history.

(56) References Cited

U.S. PATENT DOCUMENTS 9,736,580 B2 * 8/2017 Cahill .................. G01S 3/8083
10,111,013 B2 * 10/2018 Hu .......................... G09B 5/02

(Continued)

FOREIGN PATENT DOCUMENTS

CN 102282571 A 12/2011
WO 2010064122 A1 6/2010

OTHER PUBLICATIONS

International Search Report from counterpart PCT application No. PCT/US2020/018697, dated May 28, 2020, 3 pgs.

(Continued)

*Primary Examiner* — Anand P Bhatnagar

(74) *Attorney, Agent, or Firm* — Greenberg Traurig, LLP

(57) ABSTRACT

Systems and methods that yield highly-accurate classification of acoustic and other non-image events, involving pre-processing data from one or more transducers and generating a visual representation of the source as well as associated features and processing, are disclosed. According to certain exemplary implementations herein, such pre-processing steps may be utilized in situations where 1) all impulsive acoustic events have many features in common due to their point source origin and impulsive nature, and/or 2) the error rates that are considered acceptable in general purpose image classification are much higher than the acceptable levels in automatic impulsive incident classification. Further, according to some aspects, the data may be pre-processed in various ways, such as to remove extraneous or irrelevant details and/or perform any required rotation, alignment, scaling, etc. tasks, such that these tasks do not need to be "learned" in a less direct and more expensive manner in the neural network.

48 Claims, 8 Drawing Sheets

Related U.S. Application Data continuation of application No. 17/317,837, filed on May 11, 2021, now abandoned, and a continuation of application No. PCT/US2020/018697, filed on Feb. 18, 2020, said application No. 17/317,837 is a continuation of application No. 16/557,865, filed on Aug. 30, 2019, now Pat. No. 11,004,175, said application No. PCT/US2020/018697 is a continuation of application No. 16/277,993, filed on Feb. 15, 2019, now Pat. No. 10,424,048, said application No. 16/557,865 is a continuation of application No. 16/277,993, filed on Feb. 15, 2019, now Pat. No. 10,424,048.

(51) Int. Cl.
*G06F 17/15* (2006.01)
*G06N 3/04* (2023.01)
*G06N 20/00* (2019.01)
*G06F 18/24* (2023.01)
*G06V 10/82* (2022.01)

(52) U.S. Cl.
CPC ............ *G06N 20/00* (2019.01); *G06T 5/003* (2013.01); *G06V 10/82* (2022.01)

(56) References Cited

U.S. PATENT DOCUMENTS

| | | | | |
|---|---|---|---|---|
| 10,178,490 | B1 * | 1/2019 | Sheaffer | G06T 7/20 |
| 10,198,697 | B2 * | 2/2019 | Christian | G08B 13/1672 |
| 10,200,667 | B2 * | 2/2019 | He | H04N 13/275 |
| 2006/0046711 | A1 * | 3/2006 | Jung | G06N 20/00 455/423 |
| 2014/0046878 | A1 * | 2/2014 | Lecomte | G06K 9/6269 706/12 |
| 2016/0277863 | A1 * | 9/2016 | Cahill | G01S 3/80 |
| 2016/0379666 | A1 * | 12/2016 | Christian | G10L 25/27 704/276 |
| 2018/0053056 | A1 * | 2/2018 | Rabinovich | G06V 10/764 |
| 2018/0190020 | A1 * | 7/2018 | Mullins | G06T 19/20 |
| 2018/0260626 | A1 | 9/2018 | Pestun | |
| 2018/0278894 | A1 * | 9/2018 | Kanga | G06V 10/26 |

OTHER PUBLICATIONS

Written Opinion from counterpart PCT application No. PCT/US2020/018697, dated May 28, 2020, 7 pgs.

* cited by examiner

SYSTEMS AND METHODS INVOLVING CREATION AND/OR UTILIZATION OF IMAGE MOSAICS IN CLASSIFICATION OF ACOUSTIC EVENTS

CROSS-REFERENCE TO RELATED APPLICATION(S)

This is a continuation of application Ser. No. 17/381,084, filed Jul. 20, 2021, which is a continuation of application Ser. No. 17/317,837, filed May 11, 2021, which is a continuation of application Ser. No. 16/557,865, filed Aug. 30, 2019, now U.S. Pat. No. 11,004,175, which is a continuation of application Ser. No. 16/277,993, filed Feb. 15, 2019, now U.S. Pat. No. 10,424,048; application Ser. No. 17/381,084 is also a (bypass) continuation of Int'l Appln. No. PCT/US20/18697, filed Feb. 17, 2020, published as WO2020/168352, which claims priority to application Ser. No. 16/277,993; all of which are incorporated herein by reference in entirety.

FIELD

This specification relates to the processing of acoustic and non-acoustic data obtained from one or more acoustic sensor devices and identifying/classifying the nature of the event or source responsible for the acoustic signal.

DESCRIPTION OF THE RELATED TECHNOLOGY

The use of deep convolutional neural networks in practical applications is becoming synonymous with our daily lives. From self-driving cars to fingerprint recognition (Google's patent U.S. Pat. No. 5,825,907A). These applications rely on real world input and that input is only somewhat pre-processed or uses neural networks to do the bulk of the preprocessing (Christian Szegedy & Google's patent US20160063359A1). Other patents are related primarily with the recognition of speech patterns (Google's patent US20160322055A1 or US20160284347A1). These are insufficient for addressing audio signals with minimal information, similar to using the discrepancies between glottal stops made by different people and classifying the size of the glottis based on the sound. There is information loss involved in the process as well as a limiting of scope when the derivation of an answer is based solely on listening. Some representative architectures, in this regard, include the ResNet and Inception convolutional neural network architectures.

Illegal discharge of firearms or other explosive devices is an ongoing problem in our society. Specific examples include: firearms discharged during the commission of a felony; discharge of a firearm in an unsafe manner that can result in the accidental injury or death of a person, such as celebratory gunfire; poaching of endangered species or other illegal hunting; blast fishing; and acts of war or terrorism. A system that can detect and accurately locate such activities in near real-time aids law enforcement and other first responders by reducing the time required to arrive at the location of the discharge. A rapid response to such illegal activities assists law enforcement in apprehending the responsible parties and improves community safety by discouraging others from engaging in the illegal activity.

The location of acoustic events can be computed via a variety of methods. Such methods include multilateration (location computation using time difference of arrival); triangulation (location using the intersection of two or more direction of arrival vectors); range estimation using the difference between the optical and acoustic arrival times of a signal; range estimation using signal amplitude measurements along with an estimate of the emitter strength; and combinations of these techniques. Discharge of a firearm and detonation of an explosive device both generate impulsive signals of high amplitude that can be successfully located using these techniques.

A challenge to practical gunshot or explosive detection systems is the presence in the environment of other sources of loud, impulsive signals of lesser or negligible law enforcement concern, such as discharge of fireworks, vehicle backfires, pile drivers or other construction noise, or even the emptying of large refuse-storage containers. A system that seeks to dispatch law enforcement personnel to the scene within a few seconds must necessarily be automated, and in order for the automated system to be successful the false positive rate for automatically dispatched incidents (defined as one minus the ratio of events of law enforcement concern divided by the total number of dispatched events) must be kept to a low value.

Thus, the goal of automated classification of impulsive events is to correctly classify events of unknown origin into groups or classes, such as "gunfire", "fireworks", "backfire" or "construction noise". There is a further goal of identifying subclasses of these classes, such as "discharge of an AK-47" or "discharge of a 45-caliber revolver" that can be used to discriminate been friendly and hostile weapon fire events, or to inform the appropriate magnitude of law enforcement response. In general, numerous techniques exist to classify the source of an acoustic event in an automated manner.

However, these techniques typically do not provide sufficient classification accuracy in complex environments. Impulsive acoustic events that are fundamentally explosive in nature have low information content in comparison with speech, music, bird songs and other structured audio signals. The major components of impulsive acoustic events can be modelled with reasonable accuracy using a single-parameter model, as known in the art since at least 2002. The waveform detected from a single impulsive event is more characteristic of the filter applied by the environment (trees, buildings, etc.) than the source itself. For this reason, secondary characteristics such as the degree of propagation anisotropy, spacing between shots, presence or absence of echoes due to the height above ground and roofline level of the discharge provide valuable additional data that can be used to improve the accuracy of machine classification results. These data are not, in general, independent; for example, discharge of a firearm generates both an impulsive acoustic signal and an impulsive optical signal, the latter being strongest in the medium-wave (2-5 μm) infrared region of the light spectrum, and the fusion of results from acoustic and optical sensors can be expected to be more accurate than either acoustic or optical sensors alone. For this reason, it is desirable to have a general-purpose method for incorporating data collected from one or more signal transducers into a single large classification vector than can be used as input into a general-purpose machine learning/machine classification system.

One such machine classification system that has made rapid improvements in classification accuracy in recent years are "deep learning" neural networks. These neural networks make use of a large number of intermediate layers levels and may utilize newer training techniques (such as adverse training REF and obfuscation REF) with large datasets to yield impressive accuracy at common tasks such as optical character recognition or automated image classification. Effective Deep Learning neural networks require an intimidating numbers of internal connections. Further, training such networks in practical amounts of time typically requires use of complexity-reducing methods such as a convolutional in combination with parallel training on large numbers of CPUs, GPUs, or even custom ASICs optimized for the training task. These techniques are especially well-developed for the task of image recognition, since images of even modest size imply large feature spaces. For example, a 256×256 pixel RGB color image can be considered as a classification vector of length 196,608 where each entry can take one of 256 values for each color. Rarely, however, are all parts of the image of equal interest. For example, an image containing a face might also contain uninteresting information such as the texture of the wall behind the person. While a fully-connected neural network could in theory learn to recognize a feature such as a face without any down-sampling or simplification steps, a more practical approach is to use a system where the upper levels of the neural network scale, translate, and, if necessary, rotate the salient details of the image so that scaled, rotated and normalized features are passed to the lower levels of the neural network. Such networks are known as Convolutional Neural Networks (CNNs) and were first described by Yann LeCun et al. in 1999*, Object Recognition with Gradient-Based Learning*. In a convolution step, a 2D kernel (often itself a product of machine learning) is applied to the 2D input at a particular layer and only the output of the convolution is passed to the next layer. Deep learning networks targeted at image classification are now available as both stand-alone packages and as software-as-a-service offerings.

SUMMARY OF CERTAIN ASPECTS

Because these sophisticated general-purpose image classifiers are widely available, development of systems and methods by which data that is not intrinsically visual in nature can be converted to a visual representation for use in a general-purpose image classifier, as set forth herein, has proven to possess great novelty and utility. The present inventions disclose such systems and methods that yield highly-accurate classification of acoustic events by pre-processing data, such as data from one or more transducers and/or data associated with a subject event or source, and generating a visual representation of the source. According to implementations herein, such pre-processing steps may be utilized in that 1) all impulsive acoustic events have many features in common due to their point source origin and impulsive nature, and 2) the error rates that are considered acceptable in general purpose image classification (e.g., top 5 error rate REF, etc.) are much higher than the acceptable levels in automatic impulsive incident classification. Given such factors/reasons, it is typically desirable to pre-process the data in various ways, such as to remove extraneous or irrelevant details and perform any required rotation, alignment, and scaling tasks, inter alia, by using methods based on, derived from and/or bearing some relation to existing techniques, such that these tasks do not need to be "learned" in a less direct and more expensive manner in the neural network.

DETAILED DESCRIPTION OF CERTAIN ILLUSTRATIVE EMBODIMENTS

Aspects of the disclosed technology relate to systems and methods for pre-processing data received from one or more transducers in ways conducive to training a Deep Learning convolutional neural network classifier optimized for image classification.

With regard to the source location problem, it is desirable to have a plurality of devices at distinct, known locations such that time difference of arrival, angle of arrival, and/or acoustic-optical travel time distance can be used to accurately locate the source of the acoustic event and thus estimate the range from the event to each reporting sensor device.

Figure 1:
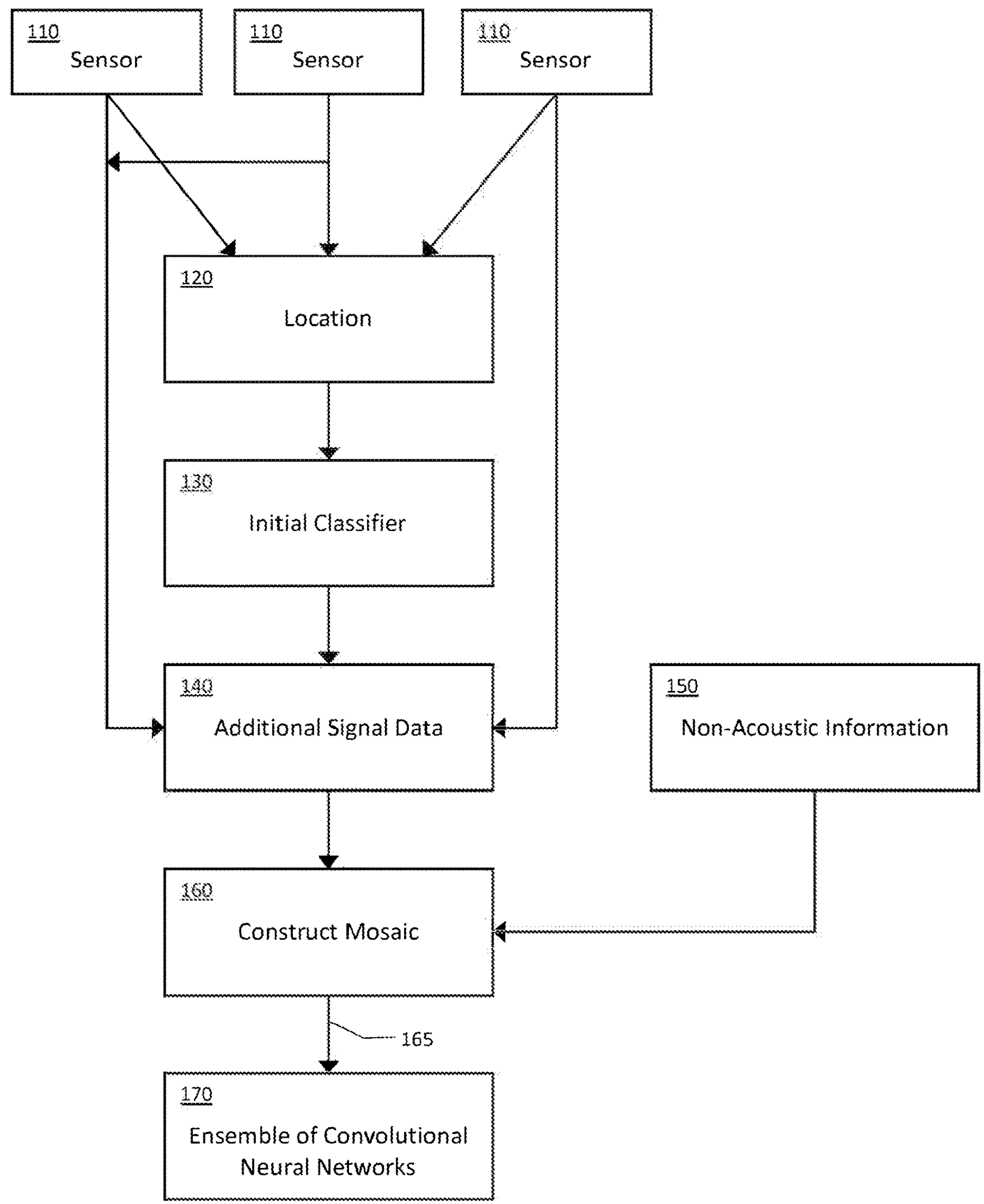
FIG. 1 is a flow diagram illustrating the process of classifying an event caught across multiple transducers, consistent with certain aspects related to the innovations herein.

FIG. 1 is a flow diagram illustrating the process of classifying an event caught across multiple transducers, according to various aspects consistent with the innovations herein. According to a first part or phase of the implementation(s) illustrated in FIG. 1, at 110, signal processing is performed on said remote sensor device to look for acoustic events of interest. In some aspects of the present inventions, when such acoustic events of interest are identified, further signal processing may be performed to reduce the dimensionality of the input transducers signals so that the resulting feature vector may be easily transferred over a low-bandwidth communication channel, such as a wireless network.

In a second part or phase of the implementation(s) illustrated in FIG. 1, at 120, these low dimensional data from one or more remote sensing devices may be utilized to locate the acoustic event in space and time using source location techniques known to those skilled in the art.

In a third part or phase of the implementation(s) illustrated in FIG. 1, at 130, a coarse identification of the location of the acoustic event may be determined using the low-dimensional data in conjunction with a machine classifier system that returns a numerical estimate that the event is of a type of interest to the system. Many such classifier systems are known to those skilled in the art and include but are not limited to naive Bayesian classifiers, neural network classifiers, convolutional neural network classifiers, support vector machines, regression classifiers, or k-nearest-neighbor classifiers.

In a fourth part or phase of the implementation(s) illustrated in FIG. 1, at 130, the quantitative output value from the third part of the invention, such as a confidence, likelihood, or probability value that the event in question is one of interest (such as a firearm discharge or explosion) is analyzed to determine a subsequent/appropriate course of action. According to some aspects, for example, the quantitative output value may be compared with a fixed or dynamically determined threshold value. Those events for which the output value falls below the threshold are discarded, while additional processing is performed on those events for which the output value is greater or equal to the threshold.

In the fifth part or phase of the implementation(s) illustrated in FIG. 1, at 140, more detailed signal data is obtained/generated/made and processed for those events that meet or exceed the threshold. For example, several seconds of waveform data collected at a sampling rate from as 4 to 48 kHz and a dynamic range of 8 bits to 32 bits from each transducer involved in the detection could either be sent directly to the processing unit performing the machine classification step, or retrieved from the remote device on demand. Further, here, various lossy and lossless compression algorithms can be used to reduce the bandwidth required to return these signal waveforms while preserving their essential characteristics.

In the sixth part or phase of the implementation(s) illustrated in FIG. 1, at 140 and/or 160, the signals are downsampled, transformed, translated, scaled, and/or converted to bitmaps such that one or more consistent visual representations of each transducer signal are generated.

In the seventh part or phase of the implementation(s) illustrated in FIG. 1, at 150, non-acoustic signal data, such as a computed distance from the acoustic source to the receiver, the history of recent acoustic events in the same area as the event just detected, local elevation information, granular weather information, etc., may be used in combination with transducer signal data (such as peak amplitude, or frequency distribution) and converted into visual representation such as plots, graphs, charts, or diagrams that can assist with correct identification.

In the eighth part or phase of the implementation(s) illustrated in FIG. 1, at 160, these multiple visual representations of data derived from one or more transducers are combined into a mosaic or composite image in a predetermined configuration. Because the mosaic image comprises data from the same acoustic event, as detected on one or more transducers, and as processed using one or more signal processing techniques, the image generated is a composite image comprising data obtained from of a plurality of remote devices, each of which comprises one or more transducers, converted into visual representations using a plurality of visual representations, such as waveforms, spectrograms, power spectra, plots, graphs, charts and similar methods for visualizing quantitative information.

In the ninth part or phase of the implementation(s) illustrated in FIG. 1, the mosaic tile image generated using the processing steps above is passed, at 165, to at least one convolutional neural network and/or other automated image classifier. Further, in some aspects, such automated image classifier may have previously been trained on images prepared in this way. The automated image classifier may then synthesize the data from these several transducers and generate more accurate results than if each transducer and processing step were to be considered independently. As such, at a high level, innovations herein may be seen as disclosing techniques of "sensor fusion" in which the combined output of multiple transducers located on one or more remote receivers yields superior results in comparison with analysis of waveform or waveform image from any single transducer.

Systems and methods herein allow input from multiple transducers located at the same or different positions to be incorporated into a single image in ways that yield increased performance over a single image. The data is pre-processed, such as to align and scale image, so as reduce training time and network complexity since rotational invariance is not required.

In the tenth part or phase of the implementation(s) illustrated in FIG. 1, at 170, multiple machine classification systems may be executed in parallel, providing redundancy in the case of failure at any stage and to provide a more robust result in the case that they all return a response. This part of the process is called the ensemble and entails using multiple outputs of classifiers. These outputs are then appropriately converted to representative confidence values, with order maintained, and are either combined appropriately or referenced at this point.

Figure 2:
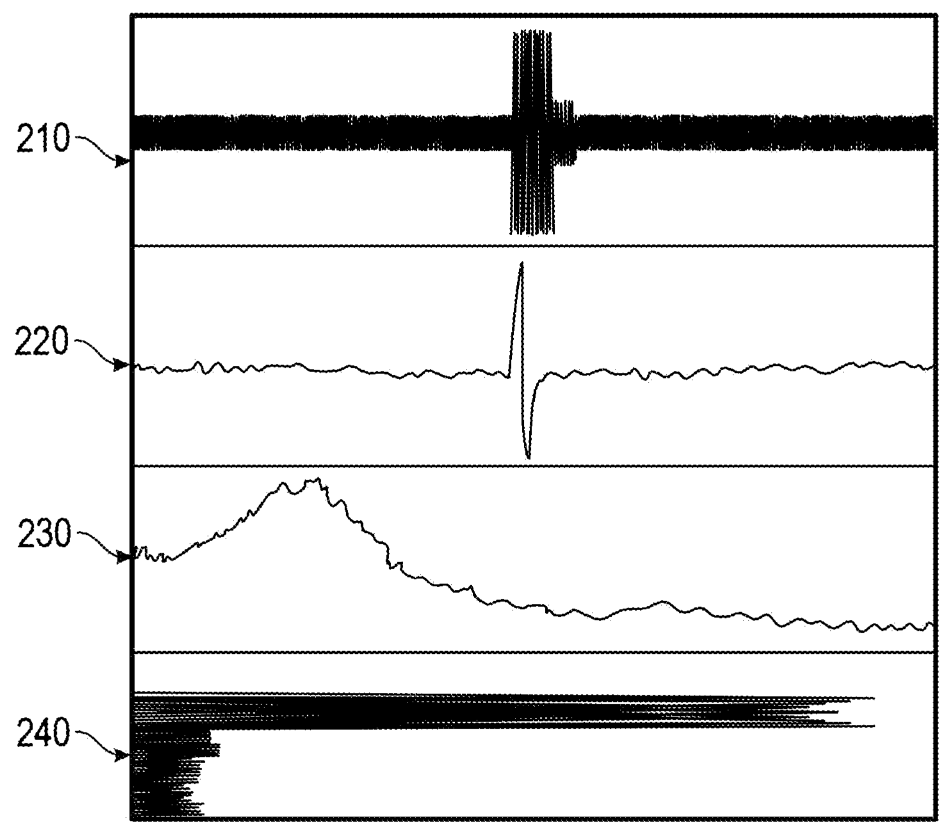
FIG. 2 is an example of one of the possible implementations of an image mosaic utilizing the time and frequency domains, consistent with certain aspects related to the innovations herein.

FIG. 2 is an example of one of the possible implementations of an image mosaic utilizing the time and frequency domains, consistent with certain aspects related to the innovations herein. FIG. 2 demonstrates one illustrative combination of mosaic elements, with 210 being the wavelet spectrogram, 220 being the waveform, 230 being the power spectra, and 240 being the spectrogram. The alignment of 210 and 220 with respect to the time domain and the alignment of the power spectra and the spectrogram with respect to the frequency domain are examples of mosaic organization/layouts configured to advantageously utilize the convolutional aspect of the neural network.

Prior to utilizing a neural network, the neural network must be trained on a substantial set of data. Such a process of "training a neural network" involving acoustic data is illustrated in FIG. 3.

Figure 3:
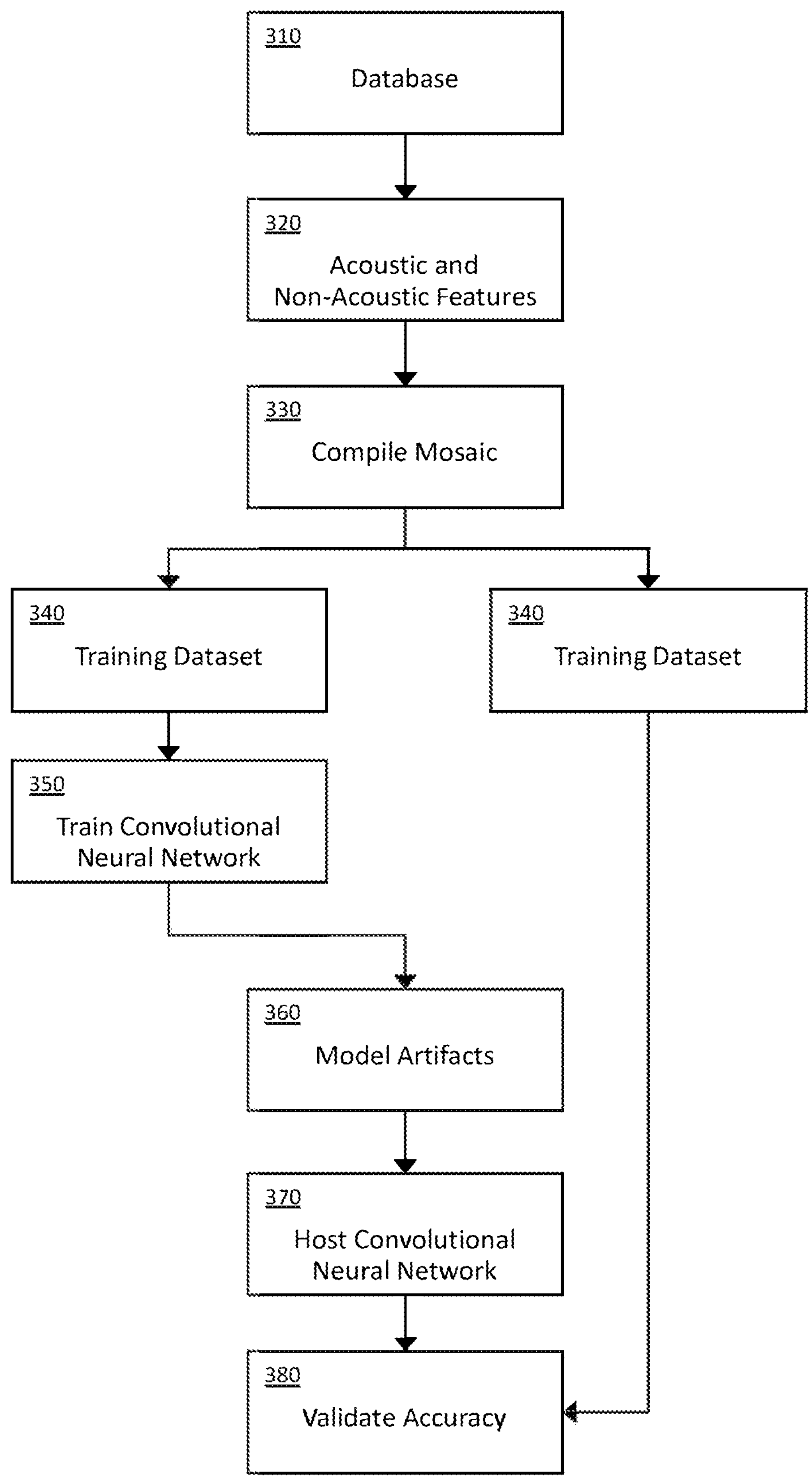
FIG. 3 is a flow diagram illustrating the process of creating a usable dataset and training on a convolutional neural network, consistent with certain aspects related to the innovations herein.

In FIG. 3, at 310, the database is used to retrieve data pertinent to a unique incident. This data will eventually become a member of the dataset after some manipulation.

Next, at 320, the acoustic and non-acoustic data are retrieved from the database, with labels assigned by our Service Operations Center. This data would need to be generated at the Location, Initial Classifier, and Additional Signal Data stages in FIG. 1 at runtime, though implementations herein retain the information after runtime incidents.

At 330, this data is converted into image representations as described above in connection with FIGS. 1-2, to compile the mosaic. The mosaics/data are then partitioned into two datasets for one for training and for validation testing, at 340.

The training dataset may then be used, at 350, to train the model with a convolutional neural network blueprint. Step 350 may be performed via established practices for training any neural network known to those of skill in the art. Model artifacts, at 360, are the checkpoints for the model at different moments in the training, we use the artifacts that produce the best results at step 380. Here, for example, empirical analyses involving the models and artifacts used to validate accuracy with respect to the audio data processing disclosed herein may be utilized to identify such best results, e.g., to aid in determining which of the various audio features in the underlying mosaics contribute to accurate training/matching. After hosting multiple sets of artifacts or checkpoints at a suitable host, e.g., at Amazon Web Services (AWS), etc., the accuracy and confusion matrix may be validated against the testing dataset, at 370.

Figure 4:
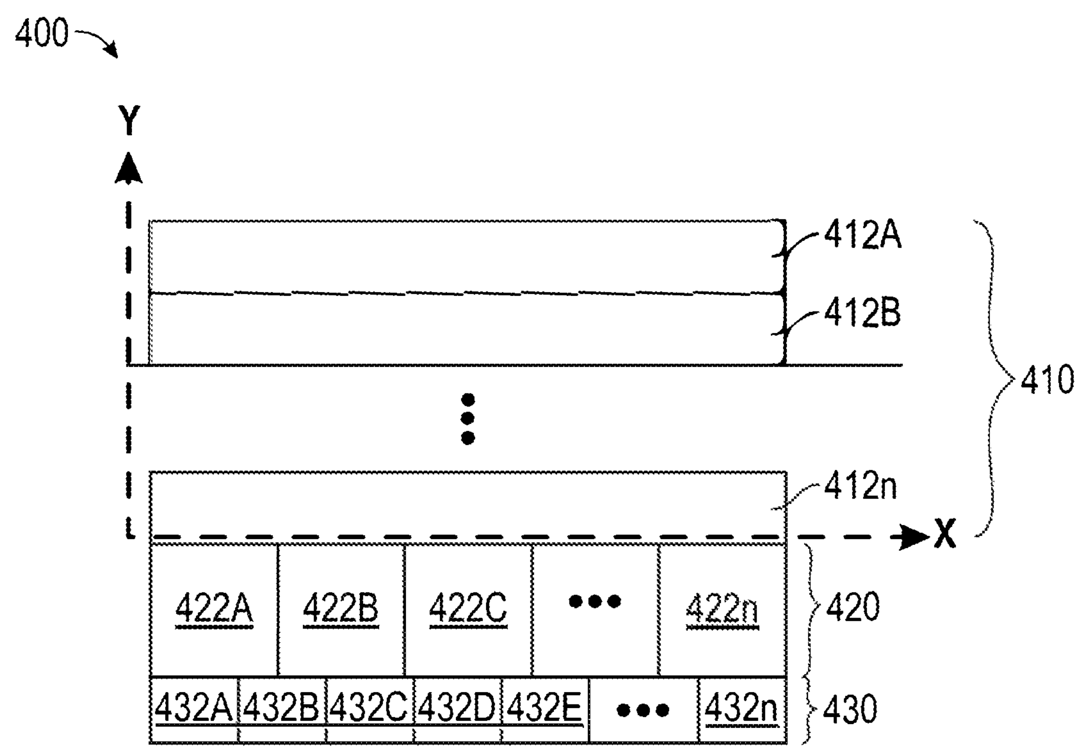
FIG. 4 is an illustration of a generic mosaic suitable for use in classification of acoustic events, consistent with certain aspects related to the innovations herein.

FIG. 4 is an illustration of a generic mosaic 400 suitable for use in classification of acoustic events, consistent with certain aspects related to the innovations herein. Representative graphical elements of a generic mosaic are depicted in FIG. 4, including components of one or more domain-related fields 410, one or more fields or rows containing additional images 420, and one or more fields or rows containing visual representations 430 of metrics, features or other graphical indicia regarding the subject audio events. Referring to the domain-related field(s), the mosaic, or portions thereof, may be characterized by a certain domain, such as timeframe, frequency, area, distance-frequency, distance-timeframe, volume, power, energy, etc. For example, the mosaic may be constructed such that various mosaic elements are mapped against one or more of such common domain(s). These domains include any representation of a higher domain projected down to a lower dimension in addition to any two or lower dimensional domains, which can be directly represented. For example, the x-axis may be time or frequency domain corresponding to the subject events, and the mosaic may contain various subcomponents mapped against such shared domain. Referring to FIG. 4, here, the generic mosaic is shown having a plurality of subcomponents (412A, 412B . . . 412*n*) that are mapped/matched against the respective domain. Further, as explained in more detail below, such subcomponents 412 may include one or more graphs, spectrograms, outputs, standardized outputs, and/or other graphical depictions of the acoustic event mapped against the selected domain. As a result of this graphical comparison over a domain, such mosaic(s) may have the effect of creating interactions between any combination of the graphs in order to create greater possibilities for the neural network to identify and/or latch onto.

While a specific image and component order ("composition order") is depicted and described in connection with FIG. 4, this particular order shown is not necessarily needed to take advantage of the effects of the convolution neural network. Other composition orders can be utilized to emphasize other aspects and just need to be used consistently between training and practice. Such differing order or arrangements each create a unique perspective in the data when convoluted with its neighbors.

In the generic mosaic 400 of FIG. 4, a field or row containing additional images 420 is also shown. While in FIG. 4 this set of additional images 420 is depicted as a row of images 422A, 422B, 422C . . . 422*n* below the domain-related field 410, such sets of additional images may be positioned or arranged in differing graphical relation to other components of a mosaic. These additional images may include though are not limited to graphs, waveforms, diagrams, graphical indicia of potentially related incidents or events, features with respect to a parameter (e.g., distance, etc.) of an event, other images, and/or portions or snippets thereof.

Further, the generic mosaic 400 of FIG. 4 may also include one or more rows or fields containing additional visual representations 430, such as visual representations of metrics, spectra, other visual indicia, and/or versions of components shown in the other fields of the mosaic (e.g., fields 410 and 420). Here, inter alia, one objective is to get certain new features for the neural network to latch onto after the convolutions have blurred and distorted the image, so a repetition of cells is encouraged, e.g., in row 430. While in FIG. 4 these additional visual representations 432 are depicted as a row of subcomponents or images 432A, 432B, 432C, 432D, 432E . . . 432*n* below the row containing additional images 420, such additional visual representations 432 may be positioned or arranged in differing graphical relation to other components of a mosaic.

Figure 5A:
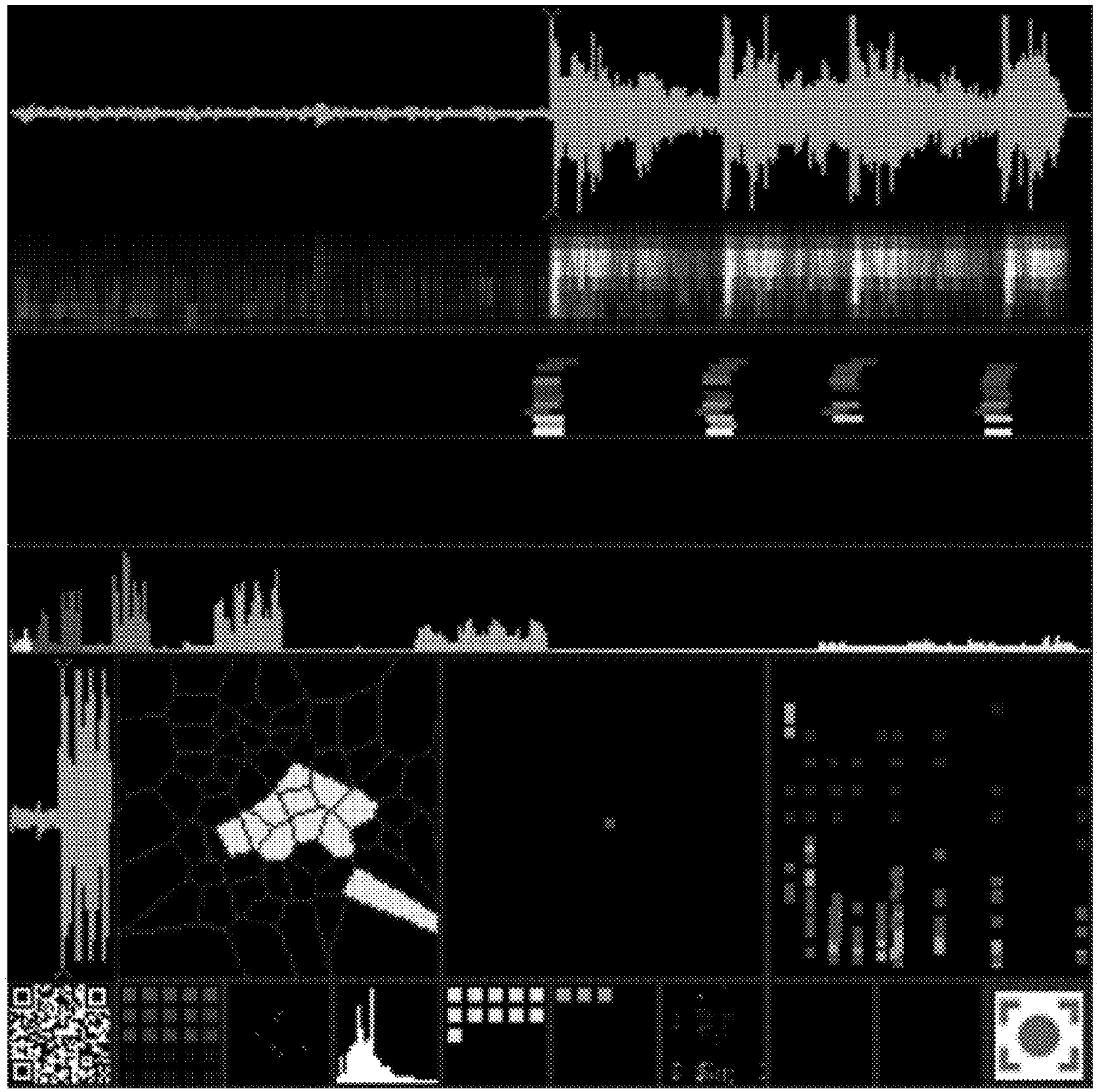
FIGS. 5A-5B are illustrations of exemplary mosaics suitable for use in classification of acoustic events, consistent with certain aspects related to the innovations herein.
Figure 5B:
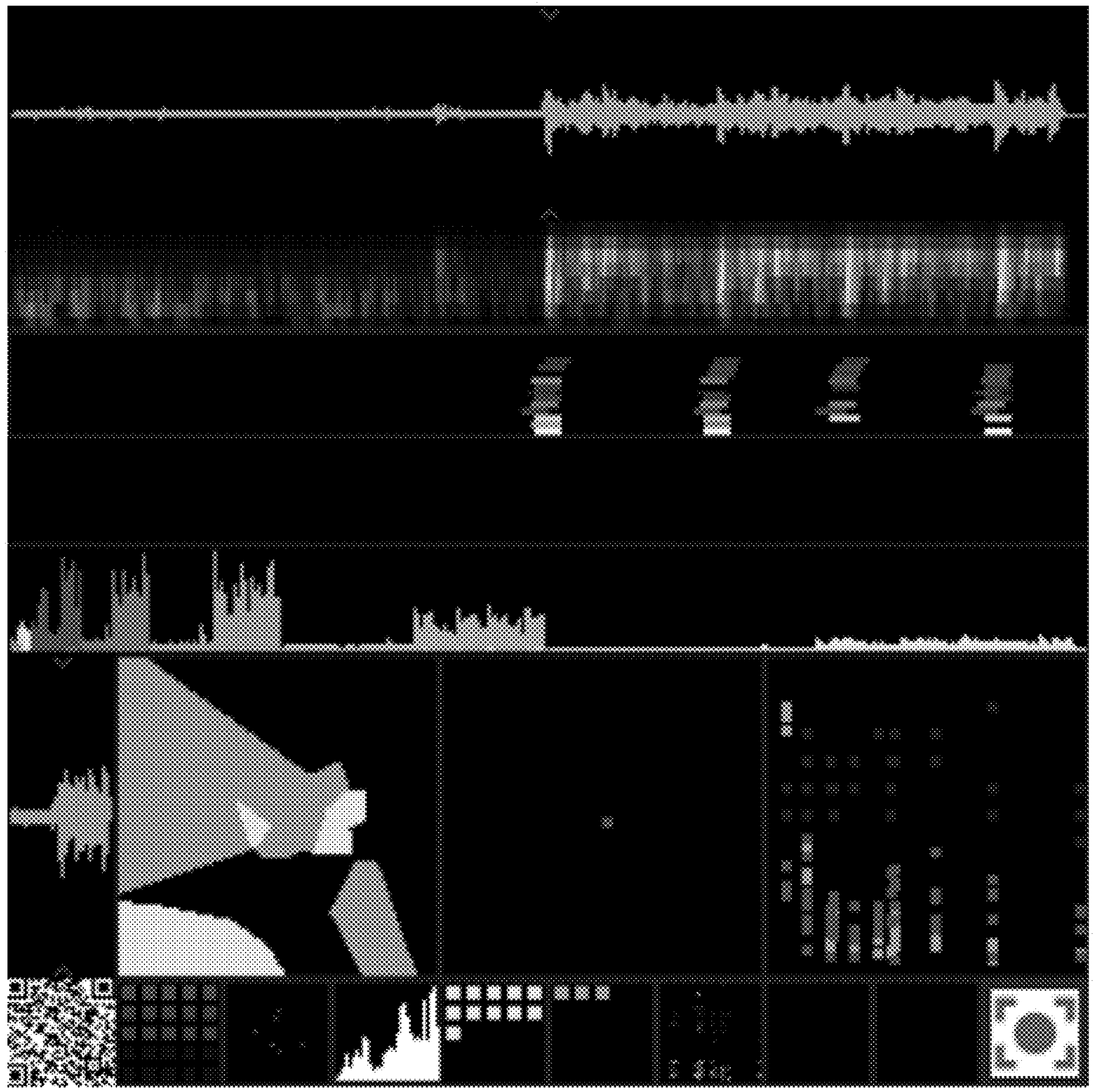
Figure 6:
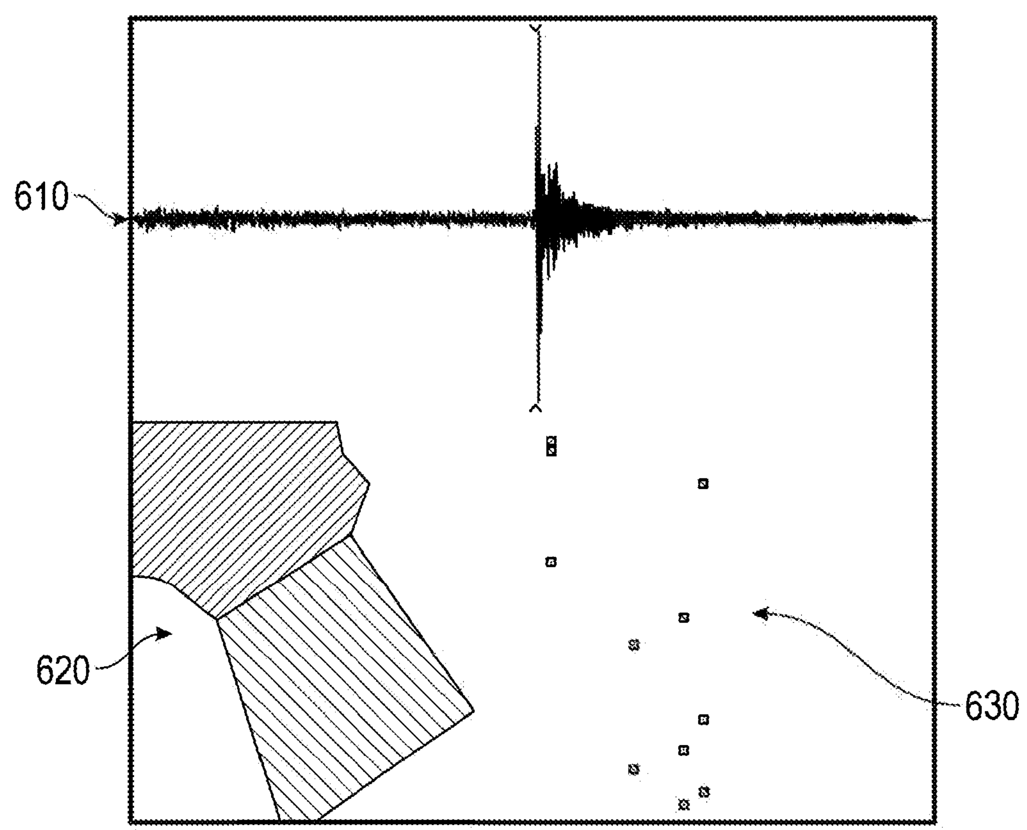
FIG. 6 is an illustration of another exemplary mosaic suitable for use in classification of acoustic events, consistent with certain aspects related to the innovations herein.

FIGS. 5A-5B and 6 depict several representative examples of illustrative mosaics that may be utilized to graphically characterize an audio impulse or signal. While these examples represent some implementations of the presently-disclosed mosaics, it should be noted that many other possible combinations or permutations of the mosaic innovation(s) are set forth and covered via this disclosure and these examples are not limiting to other such mosaic innovations that are described and claimed herein.

FIGS. 5A-5B are illustrations of exemplary mosaics suitable for use in classification of acoustic events, consistent with certain aspects related to the innovations herein. Illustrative graphical elements of the exemplary mosaic are depicted in FIGS. 5A-5B, and are described next, in order, from top to bottom, then left to right. The mosaic, or portions thereof, may be characterized by a certain domain, such as timeframe, frequency, area, etc. For example, the mosaic may be constructed such that various mosaic elements are mapped in or against one or more of such common domain(s). For example, the x-axis may be the time domain corresponding to the subject events, and the mosaic may contain various subcomponents mapped against such shared time domain. Referring to FIGS. 5A-5B, here, the illustrative mosaics are shown having 5 exemplary subcomponents (510, 520, 530, 540 and 550) that are mapped/matched against the respective time domain. Specifically, a first element of the mosaic, shown at the top of FIG. 5A, may comprise a graphical depiction of the audio signal from the sensor adjusted through a frequency domain filter 510. Below this, at 520, the mosaic may include the wavelet spectrogram of the signal. Next, at 530, a standardized output, such as an output that uses the input from multiple sensors to create a simple representation in the time domain, may be included. Further, at 540, another wavelet spectrogram of the noise, rather than the signal, may be shown as mapped against time. In the mosaic, all such features may be shown as stacked or mapped against each other, since they are different measurements in the time domain. As a result, such mosaic(s) may have the effect of creating interactions between any combination of the graphs in order to create more possibilities for the neural network to latch onto.

Mosaics may be generated with additional images including, but not limited to, a wavelet decomposition graph 550, a snippet of the waveform 560, a Voronoi diagram or other graphical representation of the reporting sensor array 570, a graph of recent nearby incidents 580, and/or certain features with respect to distance 590 where independent features may be mapped into the orthogonal color space of red, green and blue. The mosaic may also include one or more additional rows, such as a last row 595 including a visual representation of numeric metrics, the power spectrum, and a smaller version of the features with respect to distance 590B. Again, one objective is to get certain new features for the neural network to latch onto after the convolutions have blurred and distorted the image, so a repetition of cells is encouraged, as shown at the bottom of FIGS. 5A-5B. FIG. 5B differs from FIG. 5A largely in having a modified graphical representation of the reporting sensor array, in field 599. Here, FIG. 5B illustrates a modified Voronoi diagram, at 599, which has been modified to remove features, such as graphical elements, of lesser, little or no importance to the classifier and/or classification, e.g., to yield improved processing. Here, for example, blue lines were removed from the subject Voronoi diagram to allow the classifier to avoid processing such feature(s), which improved performance. Of course, removal and/or modifications, like this, can be made to other graphical elements within all areas of the mosaics for elements where similar benefits may be achieved by such adjustments.

FIG. 6 is an illustration of another exemplary mosaic suitable for use in classification of acoustic events, consistent with certain aspects related to the innovations herein. The exemplary mosaic shown in FIG. 6 includes several features shown in the previous mosaic, i.e., FIG. 5. Referring to FIG. 6, a mosaic may include, at 610, a 2.0 second waveform signal frequency domain filter at a larger size than 510. Further, the mosaic may also include, at 620, a Voronoi diagram, such as one with a slightly different set of colors. Lastly, at 630, the mosaic may include the values of some pulse features in distance versus normalized value space. The representation shown in FIG. 6 is another example of a mosaic that could be used, though it may be less effective than other implementations, for certain use cases, in terms of accuracy.

With regard to exemplary processing involving such a mosaic, from start to finish and referring to FIG. 1, sensor audio is used to determine a location in 110 and 120, then passed through a simple classifier at 130. Next, audio is downloaded from the sensors at 140, along with other non-acoustic data 150 to construct the mosaic, at 160. At this point, the mosaic image would be rendered like the examples shown in FIGS. 4-6, with audio from the first and second nearest audio waveform images, and then the images are passed to the Ensemble of Convolutional Neural Networks, at 170, to create an inference. Creation of such inferences occurs through many convolutions, which blurs many aspects of the image together. This blurring includes mixing colors together with 3×3 and 1×1 convolutions as well as areas of the image with 7×7 convolutions. As a result of such blurring and mixing, overlap and other similarities between differing sets of acoustic data can be advantageously analyzed including via the use of existing functionality already in place for image comparison. By leveraging the blurring of convolutional neural networks as well as a robust experience of the acoustic field, the combinations of this data in the form of a mosaic allow for analyzing data quickly and efficiently in real time. Not only do such combinations of data allow for automatic analysis of incoming data, they offer a unique perspective which is not able to be duplicated by any presently existing technology or means. Such unique perspective is achieved as a function of manipulating the unique combinations of the dataset, the convolutions used, and the composition order of the mosaic, any of which may be changed to create more advantageous, optimized and/or improved outputs or results, and which may also be selected or adjusted based on the data being analyzed and/or comparison(s) pursued.

Figure 7:
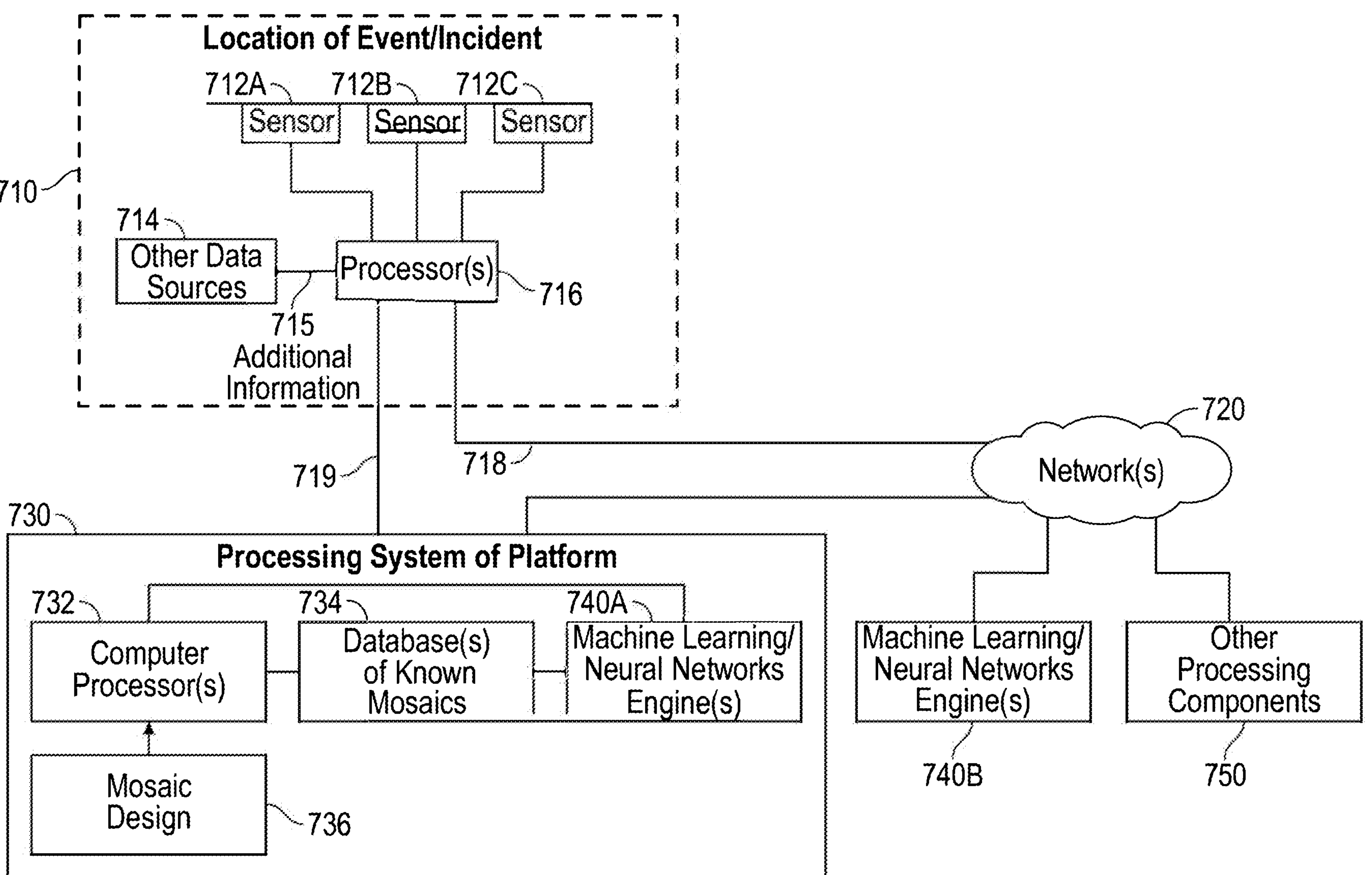
FIG. 7 is an illustration of an exemplary system adapted to perform various features and/or functionality of the disclosed technology, consistent with certain aspects related to the innovations herein.

FIG. 7 is an illustration of an exemplary system adapted to perform various features and/or functionality of the disclosed technology, consistent with certain aspects related to the innovations herein. As shown in FIG. 7, an exemplary system may include components associated with an event, incident or application 710, a processing system or platform 730, neural network(s) 740B that are external to the system or platform 730, other processing components 750 that are also external or remote from the system or platform 730, as well as one or more networks 720 through which any or all of such computing components may be connected. With regard to an event, incident or application of interest, at 710, various sensors 712, other data sources 714, and/or processing components 716 may be utilized to obtain the information to be processing via the disclosed technology. As shown in FIG. 7, for example, a plurality of sensors 712A, 712B, 712C, which may be of different types, may be utilized to obtain different streams of raw data directly associated with the event, incident or application being analyzed. Further, various data sources other than the sensors 714 may be accessed or employed to yield additional information 715 regarding the event, incident or application of interest. Here, e.g. with regard to acoustic data processing implementations herein, this additional information 715 may include non-acoustic data such as a computed distance from the acoustic source to the receiver, the history of recent acoustic events in the same area as the event just detected, local elevation information, granular weather information, or any other data or information that may impact processing (identification, analysis, etc.) of the subject event, incident or application via the image mosaics herein. Lastly, all of the data and information from the sensors 712 and the other data sources 714 may be handled, aggregated and/or processed by one or more processors 716, as part of assembling and preparing this information either for transmission to the network(s) 720, at 718, and/or for transmission directly to the system or platform 730, at 719.

The event, incident or application data from 710 may then be processed at the system or platform 730. As shown in FIG. 7, an exemplary system or platform 730 may include one or more computer processors 732, one or more databases of mosaics 734, one or more neural networks 740A, as well as data regarding a subject mosaic design 736 that is used in the neural network processing described elsewhere herein. Further, such system or platform 730 may perform processing in connection with one or more external neural networks 740B and/or one or more other processing components 750 that may perform some, all and/or different processing as that described above in connection with the image mosaic processing of the disclosed technology.

Machine learning systems tend to overestimate the accuracy of their output predictions. However, if a monotonic relationship exists between the output of a machine classifier and actual classifier accuracy—if higher classifier output values imply higher real-world accuracy—then a map can be constructed between the two. One process for calibrating classifier confidence is as follows: start with a set of input data (as potential gunfire incident images) that have been tagged by class; evaluate each incident image using a machine classification system and record the output confidence value; break the incident images into sets by output confidence value, with approximately the same number of incidents in each set; compute an estimate of the actual classifier accuracy for each set by computing the number of incidents correctly classified divided by the total number of incidents in the set; construct a map of the output of machine classifier confidence to classifier accuracy using the results for each set. This method provides a realistic output confidence for a classifier that can be used as a measure for comparing different kinds of classifiers, or comparing classifiers trained using different sets of data.

Such technique(s) can be used to increase classification reliability and/or confidence in an acoustic gunshot detection system. In a distributed acoustic sensor network that makes use of multilateration, sufficient sensor density is deployed such that a single acoustic event can be detected on two or more acoustic receivers. Each acoustic receiver will detect a different acoustic signal, a result of the asymmetry of the acoustic energy emitted by the firearm and the varying nature of the propagation path between the source and each individual receiver. In urban environments it is common for the direct acoustic path between source and receiver to be obstructed by buildings, resulting in a distorted signal that is more characteristic of the acoustic environment than of the acoustic source. Such distorted signals are more difficult for a machine-learning system to classify with high confidence. These issues can be overcome by measuring acoustic data on a plurality of acoustic receivers, generating an image mosaic for each receiver, classifying each mosaic independently using an appropriate classifier, mapping each output to a common confidence measure, and selecting the single classifier with the greatest normalized confidence as the best overall classification result. Using single-receiver images also improves the reliability of the image generation process, since successful download of audio data from a single receiver from the plurality of acoustic receivers on which downloads are attempted is sufficient to construct a valid image for classification, as is shown by the following calculation: if the probability of audio an download failure is 1% and independent of other factors and downloads are attempted from the two nearest sensors, then the probability of a successful download from both sensors is 98.01% while the probability of a successful download from either sensor is 99.99%. Creating independent image mosaics from multiple sensors results in higher classifier accuracy when multiple images are generated and fewer cases where no acoustic data is available for classification.

An alternative implementation for combining data from multiple receivers is to build a mosaic image containing acoustic data from all acoustic sensors using the methods described in the disclosed technology. This potentially increases classifier accuracy by providing more input data to a machine learning system. The downside of using acoustic data from multiple receivers in a single image is that it requires a considerably larger amount of training data (up to the square of the number of images required with a single acoustic receiver per image) to achieve the same level of training, and increases the likelihood that one or more of the acoustic waveforms necessary for image mosaic construction will not be available.

As disclosed herein, implementations and features of the present inventions may be implemented through computer-hardware, software and/or firmware. For example, the systems and methods disclosed herein may be embodied in various forms including, for example, one or more data processors, such as computer(s), server(s) and the like, and may also include or access at least one database, digital electronic circuitry, firmware, software, or in combinations of them. Further, while some of the disclosed implementations describe specific (e.g., hardware, etc.) components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the inventions or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the inventions, or it may be more convenient to construct a specialized apparatus or system to perform the required methods and techniques.

In the present description, the terms component, module, device, etc. may refer to any type of logical or functional device, process or blocks that may be implemented in a variety of ways. For example, the functions of various blocks can be combined with one another and/or distributed into any other number of modules. Each module can be implemented as a software program stored on a tangible memory (e.g., random access memory, read only memory, CD-ROM memory, hard disk drive) within or associated with the computing elements, sensors, receivers, etc. disclosed above, e.g., to be read by a processing unit to implement the functions of the innovations herein. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy logic, neural networks, other AI (Artificial Intelligence) or machine learning systems, quantum devices, and hybrids of any of the above device types.

It should also be noted that various logic and/or features disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in tangible various forms (e.g., optical, magnetic or semiconductor storage media), though do not encompass transitory media.

Unless the context clearly requires otherwise, throughout the description, the words “comprise,” “comprising,” and the like are to be construed in an inclusive sense as opposed to an exclusive or exhaustive sense; that is to say, in a sense of “including, but not limited to.” Words using the singular or plural number also include the plural or singular number respectively. Additionally, the words “herein,” “hereunder,” “above,” “below,” and words of similar import refer to this application as a whole and not to any particular portions of this application. When the word “or” is used in reference to a list of two or more items, that word covers all of the following interpretations of the word: any of the items in the list, all of the items in the list and any combination of the items in the list.

Other implementations of the inventions will be apparent to those skilled in the art from consideration of the specification and practice of the innovations disclosed herein. It is intended that the specification and examples be considered as exemplary only, with a true scope and spirit of the inventions being indicated by the present disclosure and claims and various associated principles of related patent doctrine.

The invention claimed is:

1. A method for processing image mosaics suitable for machine classification of non-image data the method comprising:
   - generating the image mosaics for use in the machine classification, the image mosaics comprised of image data and graphical indicia derived based on the non-image data, the image mosaics comprised of two or more different image subcomponents that are created based on information associated with an incident or event characterized by the non-image data;
   - assembling and/or arranging the two or more different image subcomponents in a spatial orientation within a single image mosaic as a function of correlating factors associated with the non-image data underlying the image mosaics, the correlating factors including data that enables a test incident or event to be correlated with known incidents or events; and
   - analyzing an image mosaic of the test incident or event against the image mosaics of the known incidents or events, wherein recognition of the test incident or event is improved by comparison of image mosaics of the test incident or event against image mosaics of the known incidents or events, the image mosaics being derived via machine learning.

2. The method of claim 1, wherein the machine learning engine comprises a convolutional neural network that uses the image mosaics to provide improved correlation of the test incident or event with the known incidents or events by constructing the image mosaics with the two or more different image subcomponents arranged in a format wherein the subcomponents are positioned in fixed relation and/or spaced relation to each other, and/or have their domains aligned, based on the correlating factors, such that the format is utilized by convolutional layers to improve recognition of common features achieved via convolutional processing over comparisons of single image subcomponent data.

3. The method of claim 2, wherein the format includes aligning the domains of similar and different measurements together.

4. The method of claim 2, wherein the image mosaics comprise two or more image subcomponents positioned in fixed spatial relationship to each other and two or more graphical subcomponents aligned with respect to each other along an axis characterized by a common domain shared by the graphical subcomponents.

5. The method of claim 1, wherein two or more graphical representations of the image subcomponents are combined into a same image mosaic, wherein the image subcomponents are positioned in spaced relation to each other, arranged, aligned, and/or repeated such that comparison or recognition of the image mosaic against a master mosaic image is improved by comparison of adjusted images after convolutional operations performed in convolutional layers of the neural network.

6. The method of claim 5, further comprising using machine learning classification, wherein the machine learning classification comprises a convolutional neural network that uses the image mosaics to provide improved matching of the test incident or event with the known incidents or events by constructing the image mosaics with image subcomponents that are arranged in a format wherein the image subcomponents are positioned in an established, spaced relation to each other and/or the domains of the image subcomponents are aligned, such that the format is utilized by convolutional layers to maximize recognition of common features achieved via convolutional processing.

7. The method of claim 6, wherein the format includes aligning the domains of similar and different measurements together.

8. The method of claim 6, wherein two or more graphical representations of the image subcomponents are combined into a same image mosaic, wherein the combined image subcomponents are positioned in spaced relation to each other, arranged, aligned, and/or repeated such that comparison or recognition of the image mosaic against a master mosaic image is improved by comparison of adjusted images after convolutional operations performed in the convolutional layers of the neural network.

9. The method of claim 6, wherein the image subcomponents are placed in predefined compositional order that is consistent with a same compositional order of like subcomponents in a master mosaic image to facilitate one or both of image machine learning and convolutions.

10. The method of claim 5, wherein the image mosaics comprise two or more image subcomponents positioned in fixed spatial relationship to each other and two or more graphical subcomponents aligned with respect to each other along an axis characterized by a common domain shared by the graphical subcomponents.

11. The method of claim 1, wherein the subcomponents of the image are placed in predefined compositional order that is consistent with a corresponding compositional order of like subcomponents in a master mosaic image to facilitate image machine learning and/or convolutions.

12. The method of claim 1, wherein the image mosaics comprise two or more image subcomponents positioned in fixed spatial relationship to each other and two or more graphical subcomponents aligned with respect to each other along an axis characterized by a common domain shared by the graphical subcomponents.

13. The method of claim 1, wherein the image mosaics comprises:
   - a first field or row comprised of two or more graphical subcomponents aligned with respect to each other along an axis characterized by a common domain shared by the graphical subcomponents;
   - a second field or row comprised of two or more image subcomponents positioned in fixed spatial relationship to each other; and
   - a third field or row comprised of two or more image subcomponents positioned in fixed spatial relationship to each other, wherein the image components of the third field or row are arranged and/or repeated to emphasize recognition via convolutional neural network processing.

14. The method of claim 13, wherein the common domain comprises at least one of timeframe, frequency, area, distance-frequency, distance-timeframe, volume, power, or energy.

15. The method of claim 1, wherein the single image mosaic further comprises a combination of waveform data from multiple sources into a single image.

16. The method of claim 1, wherein the two or more different image subcomponents are arranged in combinations that more-readily identify characteristics common between a new mosaic and known mosaics, in that the combinations yield adjusted and/or machine-recognizable graphical results that depict matching event characteristics via generation of the graphical results using convolutional neural network processing.

17. The method of claim 1, wherein the image subcomponents are arranged in combinations that graphically identify, as a result of convolutional neural network processing, characteristics common between a new mosaic and known mosaics in that the combinations yield adjusted graphical results that depict matching event characteristics recognizable via generation of the graphical results using the convolutional neural network processing.

18. The method of claim 1, wherein a single image mosaic further comprises a combination of waveform data from multiple sources into a single image.

19. A system configured to process image mosaics suitable for machine classification of non-image data, the system comprising:

one or more servers and/or computer processors comprising computer readable media containing computer program instructions that, when executed by at least one processor, cause the at least one processor to perform operations including:

generating the image mosaics for use in the machine classification, the image mosaics comprised of image data and other graphical indicia derived based on the non-image data, the image mosaics comprised of two or more different image subcomponents that are created based on information associated with an incident or event characterized by the non-image data;

assembling and arranging the two or more different image subcomponents in a spatial orientation within a single image mosaic as a function of correlating factors associated with the non-image data underlying the image mosaics, the correlating factors including data that enables a test incident or event to be correlated with known incidents or events; and analyzing an image mosaic of the test incident or event against the image mosaics of the known incidents or events, wherein recognition of the test incident or event is improved by comparison of image mosaics of the test incident or event against image mosaics of the known incidents or events, the image mosaics being derived via machine learning.

20. The system of claim 19, wherein the machine learning is performed by a machine learning engine that comprises a convolutional neural network that uses the image mosaics to provide improved correlation of the test incident or event with the known incidents or events by constructing the image mosaics with the two or more different image subcomponents arranged in a format wherein the subcomponents are positioned in fixed relation and/or spaced relation to each other, and/or have their domains aligned, based on the correlating factors, such that the format is utilized by convolutional layers to improve recognition of common features achieved via convolutional processing over comparisons of single image subcomponent data.

21. The system of claim 20, wherein the format includes aligning the domains of similar and different measurements together.

22. The system of claim 20, wherein the image mosaics comprise two or more image subcomponents positioned in fixed spatial relationship to each other and two or more graphical subcomponents aligned with respect to each other along an axis characterized by a common domain shared by the graphical subcomponents.

23. The system of claim 19, wherein two or more graphical representations of the image subcomponents are combined into a same image mosaic, wherein the image subcomponents are positioned in spaced relation to each other, arranged, aligned, and/or repeated such that comparison or recognition of the image mosaic against a master mosaic image is improved by comparison of adjusted images after convolutional operations performed in convolutional layers of the neural network.

24. The system of claim 23, wherein the image mosaics comprise two or more image subcomponents positioned in fixed spatial relationship to each other and two or more graphical subcomponents aligned with respect to each other along an axis characterized by a common domain shared by the graphical subcomponents.

25. The system of claim 23, wherein the operations further include:

using machine learning classification, wherein the machine learning classification comprises a convolutional neural network that uses the image mosaics to provide improved matching of the test incident or event with the known incidents or events by constructing the image mosaics with image subcomponents that are arranged in a format wherein the image subcomponents are positioned in an established, spaced relation to each other and/or the domains of the image subcomponents are aligned, such that the format is utilized by convolutional layers to maximize recognition of common features achieved via convolutional processing.

26. The system of claim 19, wherein the subcomponents of the image are placed in predefined compositional order that is consistent with a corresponding compositional order of like subcomponents in a master mosaic image to facilitate image machine learning and/or convolutions.

27. The system of claim 19, wherein the image mosaics comprise two or more image subcomponents positioned in fixed spatial relationship to each other and two or more graphical subcomponents aligned with respect to each other along an axis characterized by a common domain shared by the graphical subcomponents.

28. The system of claim 19, wherein the image mosaics comprises:

a first field or row comprised of two or more graphical subcomponents aligned with respect to each other along an axis characterized by a common domain shared by the graphical subcomponents;

a second field or row comprised of two or more image subcomponents positioned in fixed spatial relationship to each other; and a third field or row comprised of two or more image subcomponents positioned in fixed spatial relationship to each other, wherein the image components of the third field or row are arranged and/or repeated to emphasize recognition via convolutional neural network processing.

29. The system of claim 28, wherein the common domain comprises at least one of timeframe, frequency, area, distance-frequency, distance-timeframe, volume, power, or energy.

30. The system of claim 19, wherein the single image mosaic further comprises a combination of waveform data from multiple sources into a single image.

31. The system of claim 19, wherein the two or more different image subcomponents are arranged in combinations that more-readily identify characteristics common between a new mosaic and known mosaics, in that the combinations yield adjusted and/or machine-recognizable graphical results that depict matching event characteristics via generation of the graphical results using convolutional neural network processing.

32. The system of claim 19, wherein the image subcomponents are arranged in combinations that graphically identify, as a result of convolutional neural network processing, characteristics common between a new mosaic and known mosaics in that the combinations yield adjusted graphical results that depict matching event characteristics recognizable via generation of the graphical results using the convolutional neural network processing.

33. The system of claim 19, wherein a single image mosaic further comprises a combination of waveform data from multiple sources into a single image.

34. One or more computer-readable media storing a sequence of instructions that, when executed by at least one processor, cause the at least one processor to perform operations including:

generating the image mosaics for use in the machine classification, the image mosaics comprised of image data and other graphical indicia derived based on the non-image data, the image mosaics comprised of two or more different image subcomponents that are created based on information associated with an incident or event characterized by the non-image data;

assembling and arranging the two or more different image subcomponents in a spatial orientation within a single image mosaic as a function of correlating factors associated with the non-image data underlying the image mosaics, the correlating factors including data that enables a test incident or event to be correlated with known incidents or events; and analyzing an image mosaic of the test incident or event against the image mosaics of the known incidents or events, wherein recognition of the test incident or event is improved by comparison of image mosaics of the test incident or event against image mosaics of the known incidents or events, the image mosaics being derived via machine learning.

35. The computer readable media of claim 34, wherein the machine learning is performed by a machine learning engine that comprises a convolutional neural network that uses the image mosaics to provide improved correlation of the test incident or event with the known incidents or events by constructing the image mosaics with the two or more different image subcomponents arranged in a format wherein the subcomponents are positioned in fixed relation and/or spaced relation to each other, and/or have their domains aligned, based on the correlating factors, such that the format is utilized by convolutional layers to improve recognition of common features achieved via convolutional processing over comparisons of single image subcomponent data.

36. The computer readable media of claim 35, wherein the format includes aligning the domains of similar and different measurements together.

37. The computer readable media of claim 35, wherein the image mosaics comprise two or more image subcomponents positioned in fixed spatial relationship to each other and two or more graphical subcomponents aligned with respect to each other along an axis characterized by a common domain shared by the graphical subcomponents.

38. The computer readable media of claim 34, wherein two or more graphical representations of the image subcomponents are combined into a same image mosaic, wherein the image subcomponents are positioned in spaced relation to each other, arranged, aligned, and/or repeated such that comparison or recognition of the image mosaic against a master mosaic image is improved by comparison of adjusted images after convolutional operations performed in convolutional layers of the neural network.

39. The computer readable media of claim 38, wherein the image mosaics comprise two or more image subcomponents positioned in fixed spatial relationship to each other and two or more graphical subcomponents aligned with respect to each other along an axis characterized by a common domain shared by the graphical subcomponents.

40. The computer readable media of claim 38, wherein the operations further include:

using machine learning classification, wherein the machine learning classification comprises a convolutional neural network that uses the image mosaics to provide improved matching of the test incident or event with the known incidents or events by constructing the image mosaics with image subcomponents that are arranged in a format wherein the image subcomponents are positioned in an established, spaced relation to each other and/or the domains of the image subcomponents are aligned, such that the format is utilized by convolutional layers to maximize recognition of common features achieved via convolutional processing.

41. The computer readable media of claim 34, wherein the subcomponents of the image are placed in predefined compositional order that is consistent with a corresponding compositional order of like subcomponents in a master mosaic image to facilitate image machine learning and/or convolutions.

42. The computer readable media of claim 34, wherein the image mosaics comprise two or more image subcomponents positioned in fixed spatial relationship to each other and two or more graphical subcomponents aligned with respect to each other along an axis characterized by a common domain shared by the graphical subcomponents.

43. The computer readable media of claim 34, wherein the image mosaics comprises:

a first field or row comprised of two or more graphical subcomponents aligned with respect to each other along an axis characterized by a common domain shared by the graphical subcomponents;

a second field or row comprised of two or more image subcomponents positioned in fixed spatial relationship to each other; and a third field or row comprised of two or more image subcomponents positioned in fixed spatial relationship to each other, wherein the image components of the third field or row are arranged and/or repeated to emphasize recognition via convolutional neural network processing.

44. The computer readable media of claim 43, wherein the common domain comprises at least one of timeframe, frequency, area, distance-frequency, distance-timeframe, volume, power, or energy.

45. The computer readable media of claim 34, wherein the single image mosaic further comprises a combination of waveform data from multiple sources into a single image.

46. The computer readable media of claim 34, wherein the two or more different image subcomponents are arranged in combinations that more-readily identify characteristics common between a new mosaic and known mosaics, in that the combinations yield adjusted and/or machine-recognizable graphical results that depict matching event characteristics via generation of the graphical results using convolutional neural network processing.

47. The computer readable media of claim 34, wherein the image subcomponents are arranged in combinations that graphically identify, as a result of convolutional neural network processing, characteristics common between a new mosaic and known mosaics in that the combinations yield adjusted graphical results that depict matching event characteristics recognizable via generation of the graphical results using the convolutional neural network processing.

48. The computer readable media of claim 34, wherein a single image mosaic further comprises a combination of waveform data from multiple sources into a single image.

* * * * *